(12) United States Patent
Parker

(10) Patent No.: US 8,490,927 B2
(45) Date of Patent: Jul. 23, 2013

(54) SUPPORT ASSEMBLY

(75) Inventor: Simon Parker, Bristol (GB)

(73) Assignee: Airbus Operations Ltd, Bristol (GB)

( * ) Notice: Subject to any disclaimer, the term of this patent is extended or adjusted under 35 U.S.C. 154(b) by 455 days.

(21) Appl. No.: 12/736,681

(22) PCT Filed: Jun. 2, 2009

(86) PCT No.: PCT/GB2009/050601
§ 371 (c)(1),
(2), (4) Date: Oct. 29, 2010

(87) PCT Pub. No.: WO2009/150445
PCT Pub. Date: Dec. 17, 2009

(65) Prior Publication Data
US 2011/0042525 A1    Feb. 24, 2011

(30) Foreign Application Priority Data

Jun. 9, 2008  (GB) .................................. 0810460.6

(51) Int. Cl.
*B64C 3/50* (2006.01)
*B64C 1/06* (2006.01)

(52) U.S. Cl.
USPC .......................................... 244/215; 244/131

(58) Field of Classification Search
USPC ................. 244/99.3, 131, 211–217; 384/205, 384/245, 108
See application file for complete search history.

(56) References Cited

U.S. PATENT DOCUMENTS

| | | | |
|---|---|---|---|
| 2,779,555 A * | 1/1957 | Danielson ..................... | 244/216 |
| 4,248,486 A * | 2/1981 | Bradley, Jr. ................... | 384/206 |
| 4,399,970 A | 8/1983 | Evans | |
| 5,161,757 A * | 11/1992 | Large ............................ | 244/216 |
| 5,219,232 A | 6/1993 | Adams | |
| 7,004,432 B2 * | 2/2006 | Robinson ...................... | 244/211 |
| 2011/0031351 A1* | 2/2011 | Wildman ...................... | 244/131 |
| 2011/0038576 A1* | 2/2011 | Thornton et al. ............. | 384/476 |

FOREIGN PATENT DOCUMENTS

| | | |
|---|---|---|
| EP | 0 227 643 | 7/1987 |
| EP | 0 230 061 | 7/1987 |
| EP | 0 302 143 | 2/1989 |
| FR | 2 128 856 | 10/1972 |

OTHER PUBLICATIONS

International Search Report for PCT/GB2009/050601, mailed Sep. 3, 2009.
Written Opinion of the International Searching Authority for PCT/GB2009/050601, mailed Sep. 3, 2009.
Great Britain Search Report for GB Application No. 0810460.6, dated Sep. 23, 2008.

* cited by examiner

*Primary Examiner* — Tien Dinh
*Assistant Examiner* — Valentina Xavier
(74) *Attorney, Agent, or Firm* — Nixon & Vanderhye P.C.

(57) ABSTRACT

A support assembly (1) for guiding a flap (42) on an aircraft wing (41) during deployment of the flap is disclosed. The assembly comprises a guide track (2) defining a two-dimensional path, a cylindrical bearing follower (12) having a longitudinal axis constrained so as to follow said path during flap deployment, a shaft (23) extending from the bearing follower and, a spherical bearing coupling an end of the shaft to the bearing follower such that the bearing follower is rotatable relative to the shaft about the longitudinal axis of the bearing follower as it travels along the track. The spherical bearing also enabling rotation of the shaft about its longitudinal axis relative to the bearing follower and rotation of the shaft about a center point of the spherical bearing such that the flap is fret to move in multiple directions.

18 Claims, 9 Drawing Sheets

SUPPORT ASSEMBLY

This application is the U.S. national phase of International Application No. PCT/GB2009/050601, filed 2 Jun. 2009, which designated the US and claims priority to Great Britain Application No. 0810460.6, filed 9 Jun. 2008, the entire contents of each of which are hereby incorporated by reference.

FIELD OF THE INVENTION

The present invention relates to a support assembly for guiding a flap on the wing of aircraft during deployment of the flap from the wing. The assembly includes a bearing which is capable of guiding and supporting the flap throughout a wide range of movement.

BACKGROUND

A flap on an aircraft is attached to the wing at each end of the flap. A flap end support must allow for multiple degrees of freedom of movement of the flap whilst supporting the flap throughout that movement. The primary direction of movement of a flap during deployment and stowage may require it to follow an arcuate path. However, in addition to its primary direction of movement, secondary movements in other directions may also occur due to, for example, misalignments caused by wing bending which can induce axial changes in the length of the wing assembly, all of which must be accommodated for in the flap support.

In larger aircraft, the flaps may be required to follow a more unusual and constantly changing three-dimensional arc of movement during deployment so that they effectively extend widthwise (i.e. in a direction extending along the wing) in a direction which is essentially perpendicular to the direction of flow of air across the flap when fully deployed and so assume what is commonly known as a "streamwise" position. This is particularly the case with flaps that are located towards the outboard end of a wing away from the fuselage and which do not extend in a widthwise in a direction along the wing which is perpendicular to the direction of airflow when stowed, due to the tapering nature of the trailing edge of the wing to which they are mounted. This problem is less apparent with a flap located towards the inboard end of the wing closer to the fuselage as this flap may essentially extend in a widthwise direction along the wing and perpendicular to the direction of airflow over the wing when stowed.

Therefore, it may be possible for the inboard flap to follow a two-dimensional path during deployment to maintain a streamwise position.

Traditionally, the conventional structure used to support the end of a flap consists of a complex track and carriage that employs a swinging arm assembly. Although this allows for multiple degrees of freedom of movement of the flap, it is complex because it requires a large number of parts. Its bulk also causes electrical system routing difficulties and increases weight.

The provision of a track which is shaped so as to enable a carriage travelling along the track to follow a path having directional components in three dimensions has been proposed. The track can be mounted either on the falsework rib within the wing structure or, to the end of the flap itself. Although this solution results in a reduction in the number of components, a track which is shaped so as to enable movement of a carriage following the track in three-dimensions is a complex and expensive structure to manufacture and accurate inspection to ensure that it has been accurately made to specified dimensions is difficult to achieve. It has also been found that the multi-roller bearings that follow a three-dimensional track are exposed to higher loads and are more prone to jamming and experience higher wear rates due to scuffing of the bearing against the surface of the track and/or skidding of the bearing across the track surface, especially when misalignment of the flap occurs due to unusual load patterns.

The provision of adequate failsafe features to ensure continued operation despite failure of any primary components has also been problematic in each of the proposals referred to above.

The present invention seeks to provide a support assembly that substantially overcomes or alleviates the problems and disadvantages described above and to offer considerable advantages over existing solutions in terms of reduced complexity, reduced physical size and weight.

SUMMARY OF THE INVENTION

According to the present invention, there is provided support assembly for guiding a flap on an aircraft wing during deployment of the flap, the assembly comprising a guide track defining a two-dimensional path, a cylindrical bearing follower having a longitudinal axis constrained so as to follow said path during flap deployment, a shaft extending from the bearing follower and, a spherical bearing coupling an end of the shaft to the bearing follower such that the bearing follower is rotatable relative to the shaft about the longitudinal axis of the bearing follower as it travels along the track, the spherical bearing also enabling angular rotation of the shaft about a centre of the spherical bearing, such that a flap supported by said assembly is free to move in multiple directions.

The support assembly of the invention accommodates all the required degrees of freedom that are invoked whilst deploying flaps on an aircraft, such as arc of travel, wing bending misalignments and unusual flap deployment methods that are required to achieve streamwise motion.

The bearing follower preferably comprises a cylindrical bearing housing. In the preferred embodiment, the bearing follower and guide track are sized so that the bearing follower is free to roll along the track during deployment, thereby minimising skidding or scrubbing of the follower across the surface of the guide track, which would result in increased wear rates. Ideally, the bearing housing has a diameter which is slightly less than the distance between the inner surfaces of the side walls. A load applied to the guide track through the bearing follower will push the bearing housing into contact with one of said side walls and the bearing follower will roll along the surface of said side wall. However it will be appreciated that without any clearance between the bearing housing and the other side wall, the housing would rub against that other side wall increasing friction and wear rates. The clearance may be in the order of 0.5 mm.

In a preferred embodiment, the bearing housing and the guide track include primary guide elements that cooperate with each other to locate the bearing housing within the guide track.

The primary guide elements may ideally comprise a pair of spaced parallel rails and a pair of correspondingly spaced parallel grooves, respectively. The grooves and the rails mate with each other so that the bearing follower is guided along the track as it rotates. The rails are most preferably formed on the outer surface of the bearing housing with the grooves cut into the surface of the guide track. However, the rails could also be formed in the guide track, in which case the grooves are formed in the surface of the bearing housing.

In a preferred embodiment, the height of the rails is less than the depth of the grooves to ensure that the primary contact area between the bearing housing and the guide track is through the outer surface of the bearing housing remote from the grooves/ridges. This ensures that the load is spread across the width of the bearing housing rather than just between the ridges and grooves which are intended only to provide means to guide the bearing follower as it travels along the track. It is intended that little or no load is transmitted between the ridges and grooves so as to minimise the likelihood of failure of the ridges.

In one preferred embodiment, the guide track comprises a rear wall and a pair of facing side walls. The bearing housing may then be constrained between these side walls so that it moves only along a path defined between them.

Advantageously, the guide track is open at both ends. In the event that the bearing housing or part of the rails break, any loose pieces will fall out of the guide track via the open ends, thereby preventing hinderance to the continued movement of the bearing housing along the guide track.

In another embodiment, the guide track comprises a rear wall and a single side wall extending from said rear wall. This represents a half-track version of the first embodiment. A retaining element is provided to retain or captivate the bearing housing against said side wall so that it follows the path defined by said side wall and prevents the bearing housing from de-railing in the event of an impact, heavy landing or momentary heavy loads that may be experienced in flight.

In the embodiment having two sidewalls, the guide track preferably has a lip that depends from each side wall towards the facing side wall, each lip acting as secondary guide elements to guide movement of the bearing follower within the guide track in the event of failure of the primary guide elements. The bearing housing is spaced from the secondary guide elements during normal use in which the grooves and rails cooperate with each other, so that there is no increased friction between the bearing housing and the guide track.

Preferably, the bearing follower includes a cylindrical failsafe roller element immovably received within the bearing housing. Ideally, the failsafe roller element is an interference fit within the bearing housing.

The failsafe roller element may conveniently be closed at one end so as to close and end of the bearing housing which is located adjacent to the rear wall of the guide track when the bearing assembly is received within the guide track.

In a preferred embodiment, a distance between each lip of the facing side walls of the guide track is less than a diameter of the failsafe roller element received within the bearing housing. This ensures that the bearing housing cannot escape from the guide track in the event that the rails and grooves become disengaged or break.

The bearing follower preferably comprises a bearing shell located within the bearing housing. The bearing shell defines a female bearing element having a part-spherical concave-shaped bearing surface. The bearing shell may comprise two bearing race portions that abut each other when received within the bearing housing.

In a preferred embodiment, the bearing shell is received within said failsafe roller element.

The support assembly preferably includes a clamping ring to retain the bearing shell within the failsafe roller element.

Preferably, a radially inwardly extending rim depends from a leading edge of the curved surface of the bearing housing to define an aperture in an end of the bearing housing opposite to the end closed by the failsafe roller element. The tip of the rim is preferably shaped so that the aperture is part-concial in shape so that it gradually narrows inwardly towards the inside of the housing in an axial direction.

In one embodiment, the rim has an inwardly facing surface shaped to receive a leading end of the failsafe roller element remote from the closed end of the failsafe roller element.

The inwardly facing surface of the rim of the bearing housing may be shaped so as to mate with the clamping ring in the failsafe roller element.

Preferably, the shaft comprises a primary outer shaft portion and a secondary inner shaft portion sleeved by the outer shaft portion. Advantageously, there is a small clearance between the primary and secondary shaft portions so that no load is placed on the secondary inner shaft portion unless the primary outer shaft portion fails.

In one embodiment, a locking ring at one end of the shafts remote from the bearing follower to lock the outer shaft and inner shaft together.

The outer shaft preferably has a male bearing part defined by a part-spherical convex-shaped bearing surface within the bearing housing.

In one embodiment, the part-spherical convex-shaped bearing surface is disposed so as to face the part-spherical concave-shaped bearing surface provided by the bearing shell.

The bearing surfaces are preferably spaced from each other and a roller bearing element is disposed in said space between the bearing surfaces.

The roller bearing element preferably comprises a plurality of spherical roller bearings rotatably received within a bearing cage, said spherical roller bearings being of a diameter substantially equal to the distance between the facing bearing surfaces such that they contact both bearing surfaces and roll on both surfaces when the bearing follower rotates relative to the shaft about the longitudinal axis of the bearing follower as it travels along the track and when the shaft angularly rotates about the centre of the spherical bearing.

In one embodiment, the bearing shell may comprise a recess and the bearing cage comprises a tongue that locates in the recess to retain the bearing cage in position in said space between the bearing surfaces.

In one embodiment, a linear bearing element is mounted on the shaft to allow for relative movement between the end of the flap and the bearing follower in an axial direction extending along the shaft.

In a preferred embodiment, the linear bearing element is configured for attachment to a flap on an aircraft wing and the guide track is configured for attachment to a structural component of an aircraft wing.

According to the present invention, there is also provided an aircraft wing having a flap supported by the support assembly according to the invention, wherein the guide track is mounted to the wing and the linear bearing element on the shaft is mounted to the flap.

According to an alternative aspect of the present invention, there is also provided an aircraft wing having a flap supported by the support assembly according to the invention, wherein the guide track is mounted to the flap and the linear bearing element on the shaft is mounted to the wing.

BRIEF DESCRIPTION OF THE DRAWINGS

Embodiments of the present invention will now be described, by way of example only, and with reference to the accompanying drawings, in which.

DETAILED DESCRIPTION

Figure 1:
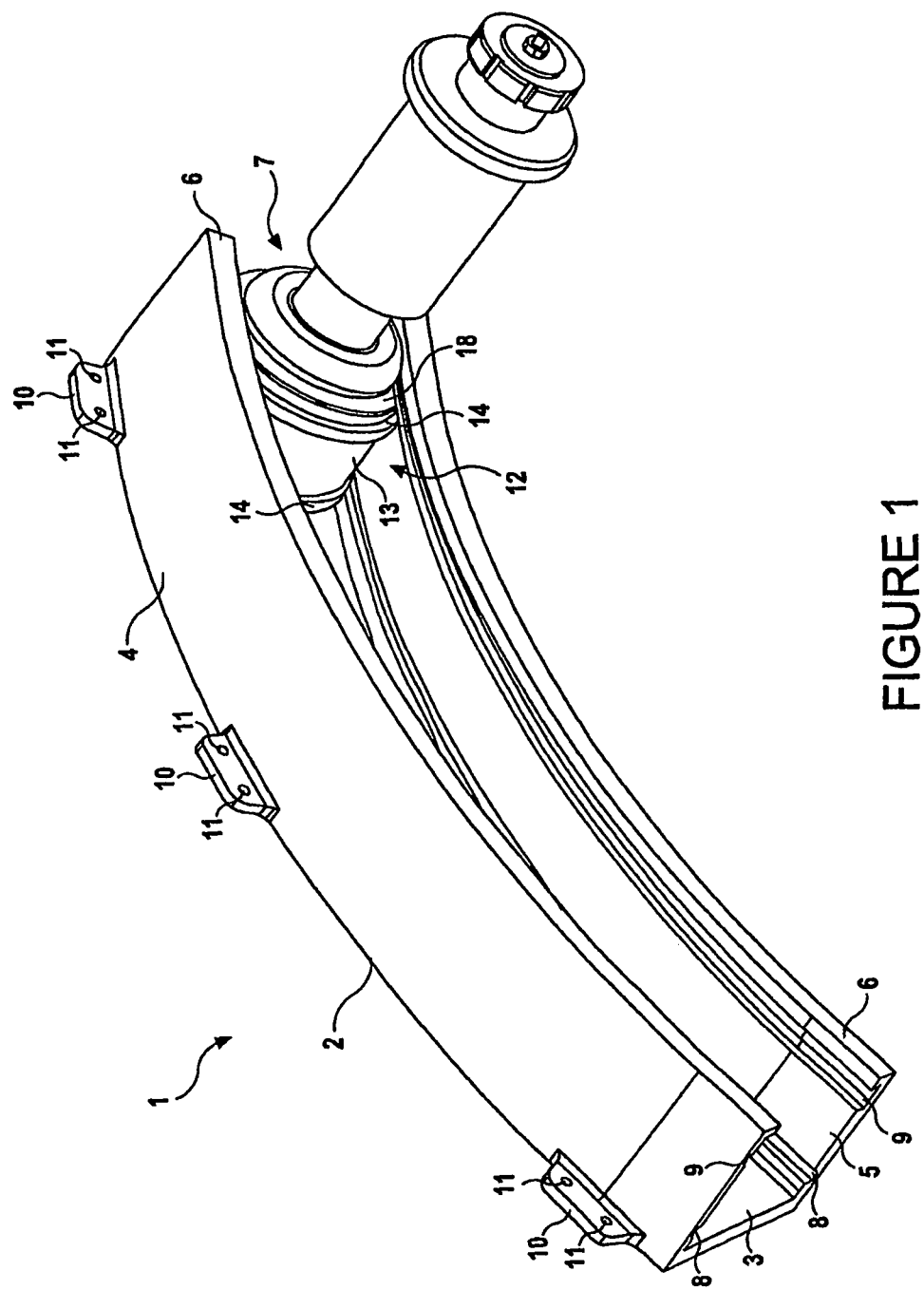
FIG. 1 is a perspective view of an embodiment of the invention comprising a guide track, a bearing follower located in the guide track and a shaft carrying a linear bearing extending from the bearing follower.
Figure 9:
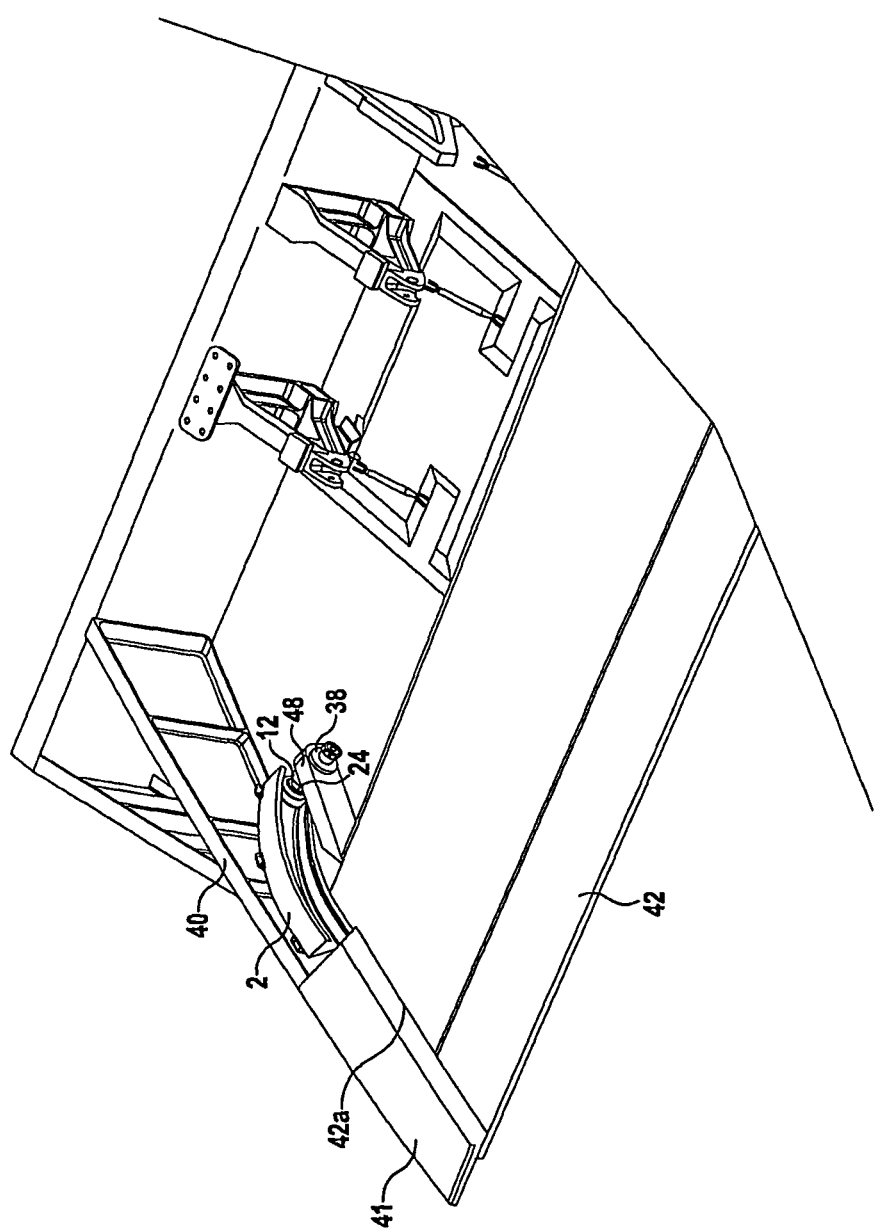
FIG. 9 shows the guide track attached to the false work rib forming the structure of an aircraft wing with the linear bearing mounted to the extension arm connected to the end flap of an aircraft wing.

Referring now to the drawings, there is shown in FIG. 1 a perspective view of a support assembly 1 for guiding the end of a flap 42 (see FIG. 9) on an aircraft wing 41 during deployment of the flap 42. The support assembly 1 comprises an arcuately shaped guide track 2 which is open at both ends and has a generally "C"-shaped cross-sectional profile defined by a rear wall 3 and two curved side walls 4,5 that are parallel to each other and extend forwardly of the rear wall 3. The front edge of each side wall 4,5 terminates in a lip 6 that extends inwardly towards the opposite side wall 4,5. A series of flanges 10 upstand from the rear edge of the upper side wall 4 to enable the guide track 2 to be immovably attached to either the false work rib or internal wing structure 40 (see FIG. 9) of an aircraft wing 41 or, to the flap or an extension of the flap using, for example, bolts (not shown) passed through holes 11 in each flange 10.

A pair of spaced parallel grooves 8, 9 are also formed on the inner surface of each side wall 4,5 and extend the entire length of the guide track 2. The guide track 2 also has an open front or mouth 7 between the lips 6 on each side wall 4, 5.

The guide track 2 defines an arcuate path that extends in two-dimensions only and so does not cause any substantial machining difficulties or tolerance inspection issues in comparison to a track defining a three-dimensional path.

Figure 2:
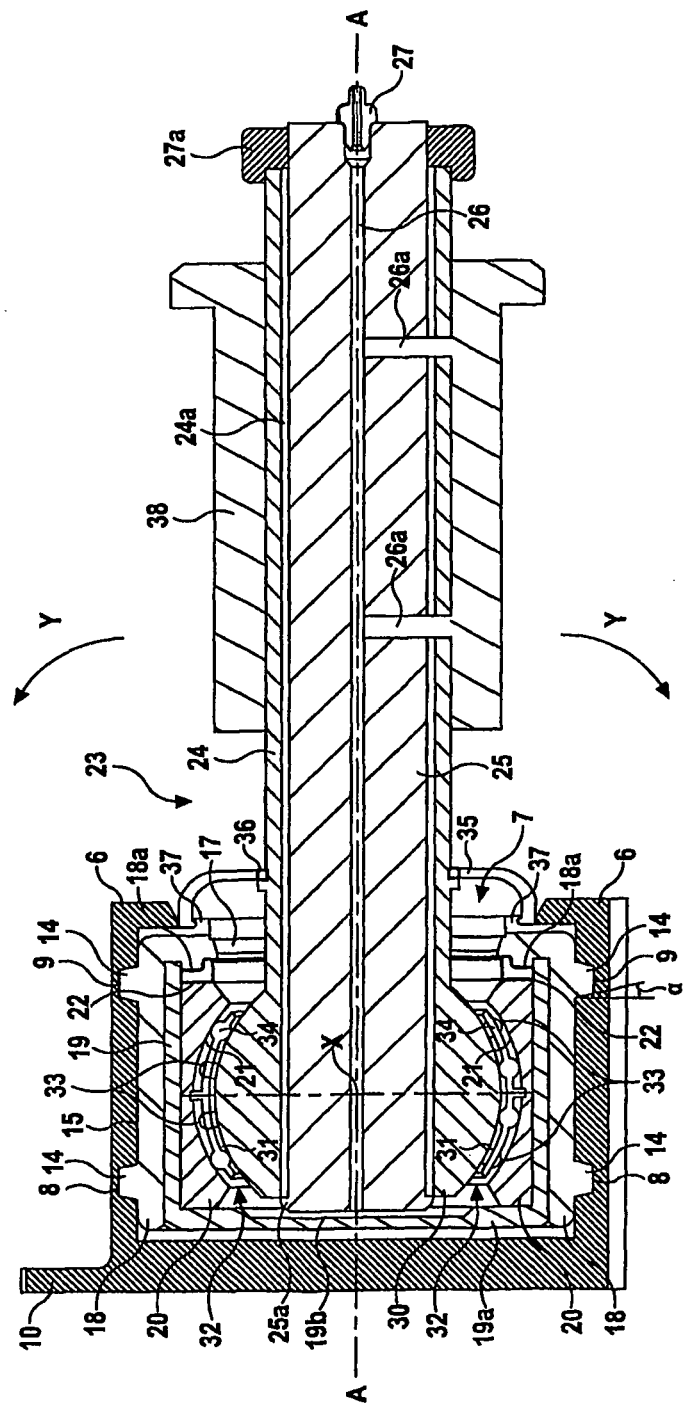
FIG. 2 is a cross-sectional side view through the guide track, bearing follower and shaft as shown in FIG. 1.

A cylindrical bearing follower 12 having a bearing housing 13 is located in the guide track 2 and is sized so that it can freely rotate about its longitudinal axis, A-A in FIG. 2, so as to roll along the guide track 2 without skidding in normal use, as it follows the two-dimensional path defined by the shape of the track during movement of the flap on deployment.

The bearing housing 13 has a pair of circumferentially extending spaced parallel ridges or rails 14 formed on its outer surface and each ridge 14 mates with a corresponding one of the grooves 8, 9 formed in each of the side walls 4, 5 of the guide track 2. Engagement of the ridges 14 and grooves 8, 9 act as primary guide elements for the bearing follower 12. Engagement of the ridges 14 in the grooves 8, 9 traps the bearing follower 12 within the guide track 2 so it is constrained to roll along the two-dimensional path defined by the guide track 2. Therefore, the bearing follower 12 is held captive in the guide track 2 and can only be removed from the guide track 2 through one of its open ends. To ensure that the bearing follower 12 does not escape from the track 2 via said open ends during normal use, the length of the track is selected so that it is longer than the maximum extent of movement of the bearing follower 12 along the track 2 in both directions during deployment of the flap 42.

The height of the ridges 14 is less than the depth of the grooves 8,9 to ensure that the primary contact area between the bearing housing 13 and the guide track 2 is through the outer surface of the bearing housing 13 remote from the grooves/ridges 8,9; 14. This ensures that the load is spread across the width of the bearing housing 13 rather than just between the ridges 14 and grooves 8, 9 which are intended only to provide means to guide the bearing follower 12 as it travels along the guide track 2. It is intended that little or no load is transmitted between the ridges 14 and grooves 8, 9 so as to minimise the likelihood of failure of the ridges 14. The grooves and rails are ultimately designed to resist axial loads so that all axial movement is accommodated via the linear bearing element.

It will be appreciated that the profile of the ridges 14 and corresponding grooves 8, 9 may take many different forms. It is envisaged that the side surfaces of the ridges 14 and grooves 8, 9 may be angled. For example, angle α (see FIG. 2) may be in the order of approximately 15 degrees. However, it is envisaged that this angle could vary between 0 and 45 degrees.

Although the illustrated embodiment shows ridges 14 formed in the bearing housing 13 and corresponding grooves 8,9 formed in the guide track 2, it is envisaged that the ridges 14 may instead be formed on the outer surface of the bearing housing 13 and the grooves 8,9 formed in the guide track 2. Furthermore, there may be only one, or more than two, cooperating grooves 8,9 and ridges 14, although it has been found that two is preferable as this minimises any instability due to abnormal vibration or shimmying effects of the bearing follower as it travels along the guide track 2.

Prior to assembly, the bearing housing 13 is open at its inner end, i.e. the end that is positioned closest to the rear wall 3 of the guide track 2 when the bearing follower 12 is received in the guide track 2. The other, outer end, of the bearing housing 13 also has an opening 17 but this opening is smaller in diameter than the opening at the inner end of the bearing housing 13 because the wall of the bearing housing 13 has a radially inwardly extending rim 18. The end surface 17a of the rim is preferably shaped so that the aperture is part-concial in shape so that it gradually narrows inwardly towards the inside of the housing in an axial direction for reasons that will be explained below.

During assembly, a failsafe roller element 19 is inserted through the open inner end of the bearing housing so that it becomes sleeved within the bearing housing 13. The failsafe roller element 19 is cup-shaped and so its bottom wall 19a closes the inner end of the bearing housing 13 adjacent to the rear wall 3 of the track 2. A depression 19b is formed on the inner surface of the bottom wall 19a for reasons that will become apparent. The failsafe roller element 19 is a tight friction or interference fit within the bearing housing 13 so that they become immovably coupled to each other. The function of the failsafe roller element 19 is to ensure that the bearing follower 12 remains captive within the guide track 2 and continues to perform its function despite failure of the bearing housing 13, as will become apparent from the description that follows.

Figure 3:
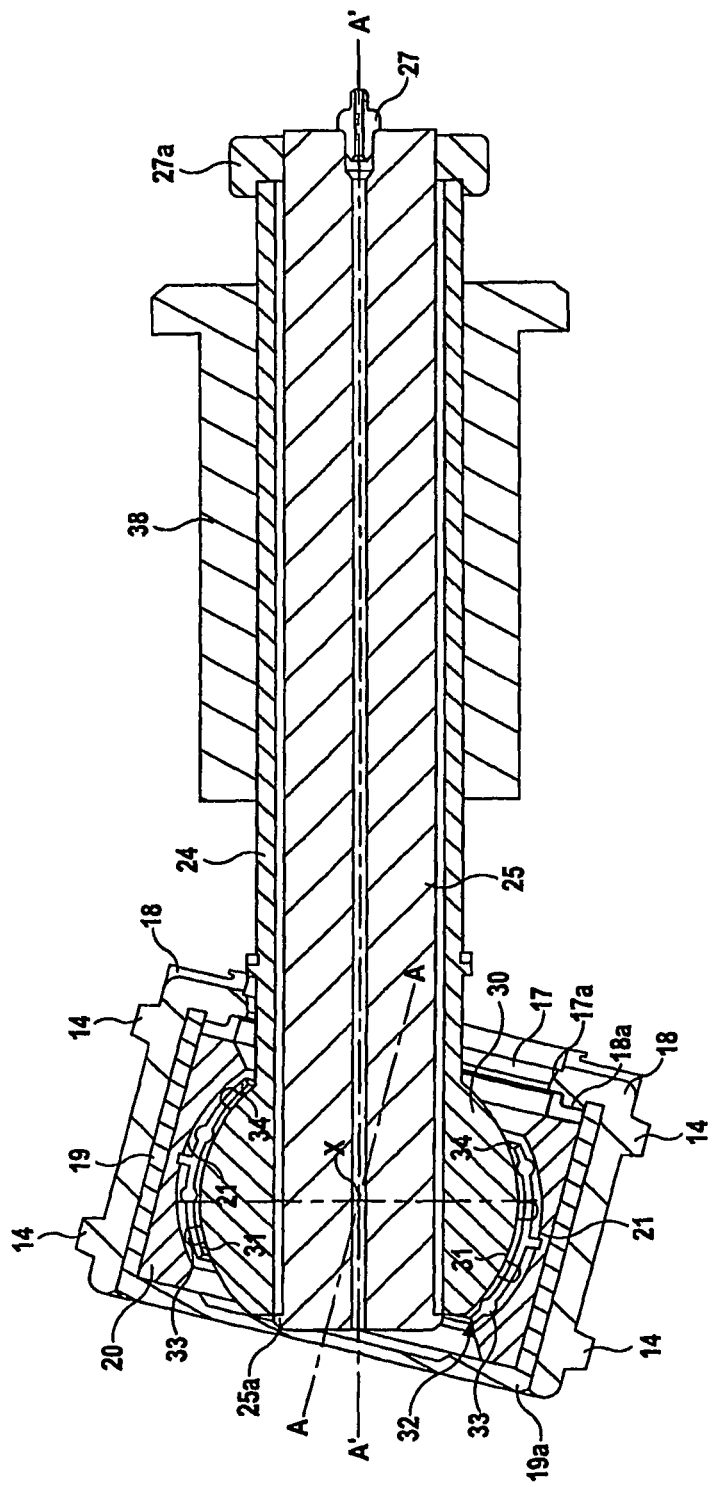
FIG. 3 is a cross-sectional side view of FIG. 2 but with after the shaft has been rotated about point "X" in the plane of the drawing.

As can also be seen from FIGS. 2 and 3, the bearing housing 13 also includes first and second bearing race portions 20a, 20b received within the failsafe roller element 19. The bearing race portions 20a, 20b together form a bearing shell 20 and the inner surface of the bearing shell 20 presents a part spherical concave-shaped or female bearing surface 21.

The bearing race portions 20a, 20b are retained within the failsafe roller element 19 by a clamping ring 22 that engages with the inner surface of the failsafe roller element 19 once the bearing race portions 20a, 20b have been inserted into the failsafe roller element 19.

The rim 18 of the bearing housing has an inwardly facing surface 18a which is shaped to conform with the shape of the clamping ring 22 so that the clamping ring 22 seats against the formation 18a when the failsafe roller element 19 is received within the bearing housing 13.

One end of a shaft 23 is received in the bearing housing 13 and extends from it through the clamping ring 22, the opening 17 and through the mouth 7 of the guide track 2. The shaft 23 has a hardened, tubular, outer or main shaft portion 24 and a more malleable inner failsafe portion 25 which is sleeved by the outer portion 24. The inner shaft portion 25 performs little function during normal operation, except to provide an axially extending conduit 26 for the passage of lubricating fluid along the inner shaft 25 to the inside of the bearing housing 13 which can be supplied to the conduit 26 via a grease nipple 27 at the end of the inner shaft 25 remote from the bearing housing 13. In circumstances in which the outer shaft 24 fails, the inner shaft 25 carries the load and ensures that the assembly continues to function adequately until replacement of the outer shaft 24 is possible. The inner shaft portion 25 and outer shaft portion 24 are preferably separated by a clearance gap 24a extending along the length of the shafts 24, 25.

Figure 4:
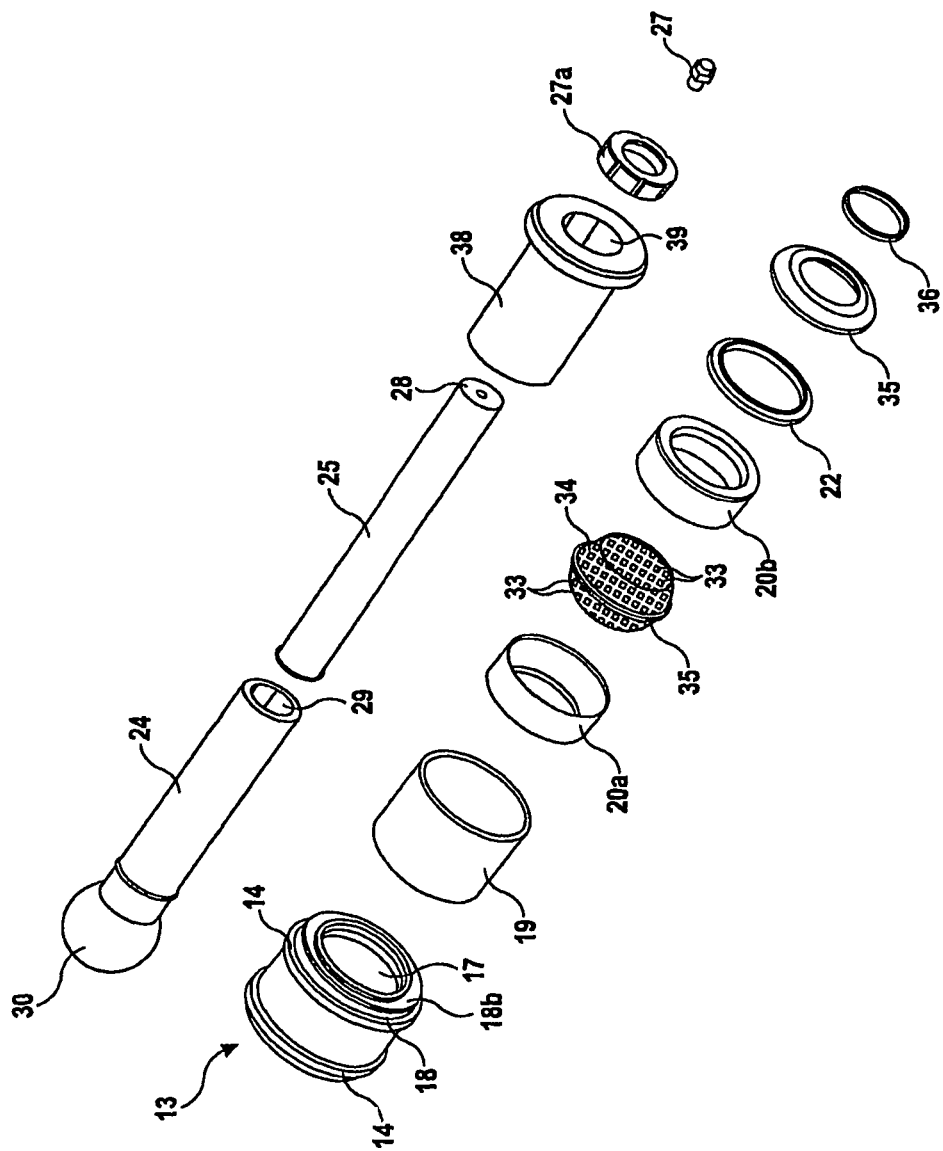
FIG. 4 is an exploded perspective view of the bearing follower and shaft assembly shown in FIGS. 1 and 2.

The outer surface of the inner failsafe shaft 25 has a flattened region 28 (see FIG. 4) extending the length of the shaft 25 and the wall of the outer shaft 24 has a correspondingly flattened region 29. The flattened regions 28, 29 cooperate with each other when the inner shaft 25 is slid within the outer shaft 24, to prevent relative rotation of the main and failsafe shafts 24, 25.

The failsafe shaft 25 is longer than the main shaft 24 and is positioned so as to extend beyond the outer shaft 24 at each end. In the bearing housing 13, the end of the failsafe shaft 25 has an integrally formed flange 25a that extends radially over the end of the outer shaft 24 to prevent the outer shaft 24 from sliding beyond the end of the inner shaft 25. At the other end, an annular locking nut 27a also locks the main and failsafe shafts 24, 25 together to prevent relative axial movement between them.

The wall of the outer shaft 24 has a enlarged diameter bulbous head portion 30 within the bearing housing 13 that has a part spherical convex-shaped or male outer bearing surface 31 which corresponds to the part-spherical concave-shaped female outer bearing surface 21 defined by the bearing shell 20. A space 32 is formed between the part spherical outer surface 31 of the enlarged diameter head portion 30 of the outer shaft 24 and the inner part-spherical surface 21 of the bearing shell 20 and a ball bearing array 33 is received within the space 32. The ball bearings 32 are retained within a support cage 34.

The support cage 34 and ball bearing array 33 effectively floats in the space 32 between the head 30 and bearing shell 20 but the support cage 34 is also provided with a circumferentially extending rib 35 (visible in FIG. 2 but most clearly shown in FIG. 4) for engagement in a correspondingly shaped slot 36, formed between each bearing race portion 20a, 20b of the bearing shell 20, to capture the support cage 33 so that the support cage itself remains stationary.

The bearing follower 12 which comprises the bearing housing 13, the failsafe roller element 19, the bearing shell 20 and the retaining ring 22 form a spherical bearing assembly, together with the head 30 on the main shaft 24, the ball bearing array 32 and the support cage 33. This spherical bearing assembly allows for radial movement of the flap during deployment and also allows the bearing follower 12 to rotate about its longitudinal axis A-A relative to the shaft, irrespective of the orientation of the shaft 24, so that it rolls along the guide track 2 during normal operation. The spherical bearing assembly enables unrestricted freedom of movement i.e. angular rotation of the shaft 24 in all dimensions about the centre of the spherical bearing assembly, that movement being limited only by a maximum angle at which the shaft 24 clashes with the bearing housing 13. It will also be appreciated that rotation of the shaft about its longitudinal axis relative to the bearing housing is also possible and may be necessary depending on the deployment path of the flap.

It will be appreciated that the shaft 23 and the bearing housing 13 can rotate relative to each other about a point, indicated by "X" in FIG. 2, in all directions (such as indicated by arrows "Y" in FIG. 2 and as shown in FIG. 3). Point X lies on the longitudinal axis A-A of the bearing follower 12 and is the centre of a theoretical sphere formed by the outline of the part-spherical outer surface of the head 30 on the main shaft 24 and the part-spherical inner surface 21 of the bearing shell 20. In FIG. 2, the position of the shaft 24 is such that the longitudinal axis A-A of the bearing follower 12 and the longitudinal axis of the shaft 24 is coaxial. However, as will be appreciated from a consideration of FIG. 3, the axis A-A of the bearing follower is now angled relative to the longitudinal axis A'-A' of the shaft 24. Irrespective of whether these axes are coaxial or angled relative to each other, the bearing follower 12 can still rotate relative to the shaft 24 about its longitudinal axis A-A, due to the spherical bearing assembly. It will be noted that the guide track 2 and boot 35 has been omitted from FIG. 3 for clarity.

The angular limit of movement of the shaft 23 is determined by the diameter of the main shaft 24 relative to the diameter of the opening between the end surfaces 17a of the rim 18 of bearing housing 13, as the main shaft 24 will clash with the edge 17a of the bearing housing 13 when the limit of movement has been reached. The greater the diameter of the shaft 24, the smaller will be the arc of movement of the shaft 24. It is anticipated that the shaft 24 must be able to accommodate approximately +/−23 degrees of angular movement in all planes prior to striking the edge 18 and so, in effect the shaft 24 will be rotatable throughout a 30 degree conical arc of movement. The most stressed component of the assembly is the shaft 24 and so the bending moment of the shaft 24 drives the whole design and size of the spherical bearing assembly that is required for a given application. As previously mentioned, the end surface 17a is preferably shaped so that the aperture is part-concial in shape so that it gradually narrows inwardly towards the inside of the housing in an axial direction so that, in the event of contact between the shaft 24 and the edge 18, contact will be across the conical shaped face of the surface 17a, thereby avoiding any point contact between the shaft 24 and the bearing housing 13. It will be appreciated that, in normal operation, there will be no contact between the surface 17a and the shaft 24 and that at least 1 degree angle of clearance will be incorporated into the design, i.e. limitations of movement are controlled by the geometry of the flap, not by the support assembly. The shaft 24 is shown at its most extreme angle of inclination in FIG. 3 from which it is apparent that the shaft 24 is about to contact the angled surface 17a of the rim 18.

In addition to enabling the bearing follower 12 to rotate about its longitudinal axis, and the shaft 24 to rotate about the centre 'X' of the spherical bearing, the spherical bearing assembly also enables the shaft 24 to rotate about its longitudinal axis relative to the bearing follower 12, thereby allowing multiple degrees of freedom of movement of a flap mounted to the support assembly.

It has been found that because all forces (rolling, rotational and axial) act through the theoretical centre point "X" of the spherical bearing assembly, any misalignment that occurs is self-correcting so that it is not possible for the bearing housing 12 to become jammed in the guide track 2 as the spherical/rolling function of the bearing assembly compensates for any jamming loads and releases itself on a continuous basis throughout its movement. The same self-aligning and compensating ability is present in the horizontal and vertical plane, especially as a load is applied.

As explained above, in addition to angular movement of the shaft 24 about centre point "X", the above-described configuration also allows the bearing follower 12 to rotate about its longitudinal axis A-A as it rolls along the guide track 2.

The spherical bearing assembly described above has been found to minimise the internal friction between bearing surfaces and increase responsiveness, as well as minimise skidding of the bearing housing 13 as it travels along the guide track 2. As has already been mentioned above, a conduit 26 is provided in the inner failsafe shaft 25 to enable lubricating fluid to be provided to the ball bearing array 32 in the spherical bearing assembly and the end wall of the failsafe roller element 19 has a depression 19b which provides a space between the end of the failsafe shaft 25 and the end wall of the failsafe roller element 19 to allow lubricating fluid to flow into the bearing housing 13 and lubricate the ball bearing array 32 and the bearing surfaces 21,31. The space 19b also provides sufficient clearance between the end of the shaft 24, 25 so the shaft can rotate about point X without coming into contact with the end wall 19a of the failsafe roller element 19. Radially extending grease galleries 26a also extend from the conduit 26 to the linear bearing element 38 (referred to below) so as to provide lubrication to a linear bearing element 38.

It will be appreciated that the lubrication conduit 26 and grease galleries 26a constitute a flush-through lubrication system so that, when fresh grease is forced into the conduit 26 through the grease nipple 27 which seals itself after use, the old grease will be forced out, primarily from around the split slip ring 36 due to bearing movements. This positive pressure flush through method of lubrication should eliminate grime ingress into the bearing housing.

Although a rolling element bearing is considered preferable, it is also envisaged that a plain bearing, such as a lubrication free plain PTFE bearing, could also be used. A plain bearing would reduce the risk of grit and grime ingress that can occur with lubricated bearings. However, the operation of such a bearing is limited because of the increased tendency for the bearing follower to skid along the guide track due to the high torque requirements both under no load and loaded conditions, resulting in increased friction and component wear.

If plain bearings are to be used, it has been considered possible to minimise skidding of the bearing follower by providing the guide track 2 with a toothed rack element and appropriate mating teeth to the outer surface of the bearing housing 13 so as to provide a positive drive between the guide track 2 and bearing housing 13. However, although this will completely eliminate skidding of the bearing housing 13 within the guide track 2, it adds complexity and is impractical because the ability for the bearing housing 13 to skid along the track 2 may be desirable in a failsafe mode in which the spherical bearing assembly itself has failed.

A flexible rubber boot 35 extends over the opening 17 in the bearing housing 13 and extends around the shaft 24 so as to prevent the ingress of dirt or contaminants into the spherical bearing assembly. The rubber boot 35 is mounted to the shaft 24 using a split slip ring 36 to prevent twisting of the rubber boot 35 due to any rotation of the shaft 24 during deployment of the flap 42. The rubber boot 35 attaches to a hook shaped formation 37 on the outer surface 18b of the radially inwardly extending rim 18 of the bearing housing 13.

A linear bearing element 38 is mounted on a portion of the main shaft 24 extending from the bearing housing 13. The linear bearing element 38 is preferably a re-circulating ball linear bearing although it could also be a plain or some other type of rolling element bearing. The linear bearing element 38 allows relative movement between the shaft 24 and the part of the aircraft to which the linear bearing element 38 is mounted (whether that be the flap or the wing structure) in an axial direction along the length of the shaft 24 and is intented to accommodate wing bending induced length changes in the wing assembly and misalignments. The linear bearing 38 has a flattened internal face 39 that mates with the flattened wall portion 29 of the outer shaft 24 so that the linear bearing cannot rotate relative to the outer shaft 24; all rotational forces being accommodated through the spherical bearing assembly.

In an alternative embodiment, a linear bearing may be disposed between the inner and outer shafts so that the inner and outer shafts slide relative to each other to allow for changes in axial distance between the flap and the aircraft wing. For example, the outer shaft may form part of or extend only within the spherical bearing assembly and the linear bearing element may be disposed between the outer shaft and the inner shaft within the spherical bearing assembly so that the inner shaft slides axially through the spherical bearing assembly relative to the outer shaft. Additional clearance must be provided between the end of the inner shaft and the end wall of the failsafe roller element 19 so that the end of the shaft can protrude further from the spherical bearing assembly during relative movement of the inner shaft in the axial direction. However, it is preferable for the inner and outer shafts to remain in fixed relative positions so that the inner shaft is used only in the event of failure of the outer shaft, thereby providing a failsafe.

It will be appreciated that the axis of the linear bearing 38 is coaxial with the axis of the shaft 24 which extends through the theoretical centre point "X" of the spherical bearing assembly. It is envisaged that the linear bearing element 38 will need to be able to accommodate a force of 20KN's and a wing bending extension/compression of +/−23 mm, thus giving 46 mm lateral movement within the bearing design, although it will be appreciated that greater loads and range of movements can be designed for.

Figure 7:
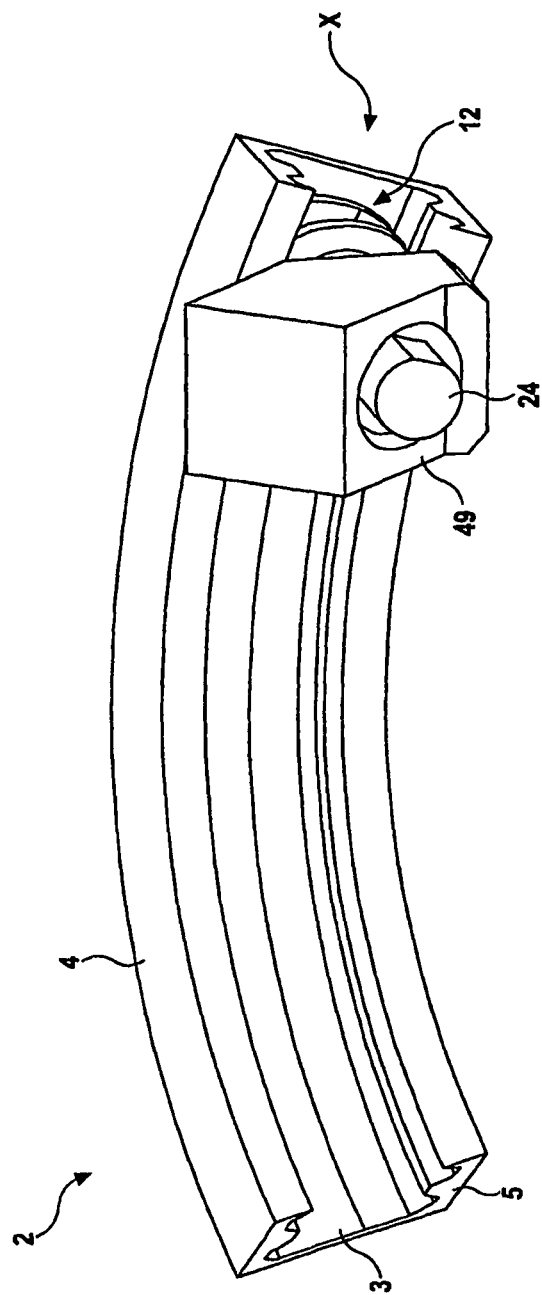
FIG. 7 is a perspective view of yet another alternative guide track embodiment in which the track defines a partially rotated swept profile.
Figure 8:
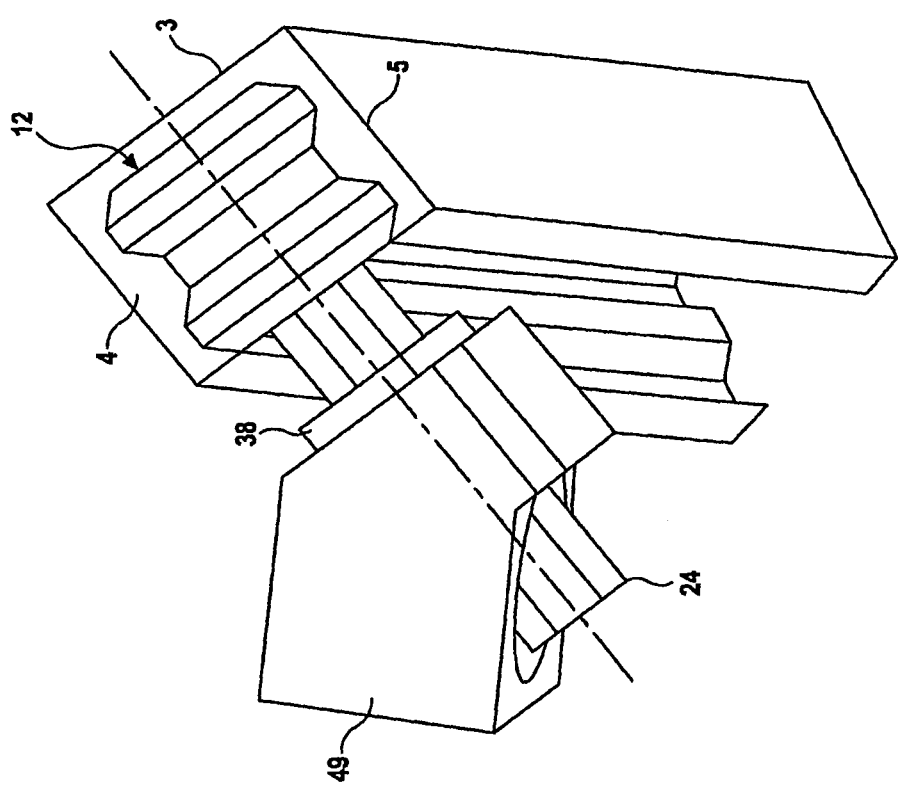
FIG. 8 is an end view of the alternative guide track embodiment of FIG. 8.

A further alternative shape for the guide track is shown in FIGS. 7 and 8. In this embodiment, the guide track 2 has a generally swept or rotated profile. However, despite the apparent illusion that the track 2 extends in three-dimensions, it still only defines a two-dimensional path. This can be appreciated more readily from FIG. 8 which shows a view looking directly at one end of the track 2, i.e. in the direction of arrow "X" in FIG. 7. As can also be seen in FIGS. 7 and 8, a 45 degree extension arm 49 is mounted to the linear bearing element 38 which is attached to the flap end.

Reference has already been made to the provision of various failsafe features which are incorporated into the design to ensure that the support assembly will continue to perform its function even if one of the main components breaks or fails. For example, the guide track 2 is left open at both ends so that, in the event the bearing housing 13 fails and shatters, the broken pieces will fall out of the guide track 2 through the open ends due to the arcuate shape of the guide track 2. Therefore, movement of the remaining assembly along the track 2 will not be hindered or prevented.

As has already been mentioned above, the failsafe roller element 19 ensures that if the bearing housing 13 fails, the failsafe roller element 19 will continue to fulfil the function of the bearing housing 13 and will slide or skid along the guide track 2 despite the lack of cooperation of the grooves 8,9 and ridges 14. However, it will be appreciated that the provision of the failsafe roller element 19 is optional and that the bearing race portions 20*a*, 20*b* may be received directly within the bearing housing 13.

It will also be appreciated that the bearing housing 13 will still travel along the guide track 2 even in the absence of cooperation between the ridges 14 and grooves 8, 9, and a degree of skidding is intended as a failsafe in the event that the ridges 14 break. Furthermore, the rear wall 3 of the guide track 2 acts as guide surface and the lip 6 extending from each side wall 4,5 acts as a secondary guide element to guide and retain the bearing housing 13 within the guide track 2 in the event of failure of the ridges 14. As can be seen from FIG. 2, the width of the bearing housing 13 is less than the distance between the rear wall 3 and the lip 6 so that, in normal operation when the ridges 14 are seated in the grooves 8, 9, the bearing housing 13 does not contact either the rear wall 3 or the lip 6 depending from each side wall 4, 5 of the guide track 2.

It will be appreciated that the lip 6 on each side wall 4, 5 of the bearing housing 13 extend inwardly toward each other from the leading edges of the side walls 4, 5 to an extent that even if the bearing housing 13 breaks and falls away, the failsafe retaining element 19 cannot escape from the guide track because it is retained within the guide track 2 by the lip 6 that extends beyond the end of the failsafe roller element 19.

The linear bearing element 38 preferably has an inner and outer linear bearing housing so that, if one housing fails, the other housing carries the load. Furthermore, as has already been described above, in the event that the main shaft 24 fails the inner failsafe shaft 25 will carry the load instead, although it will be appreciated that the main shaft 24 may not have a failsafe and so could be a single shaft rather than one shaft sleeved within the other.

Figure 5:
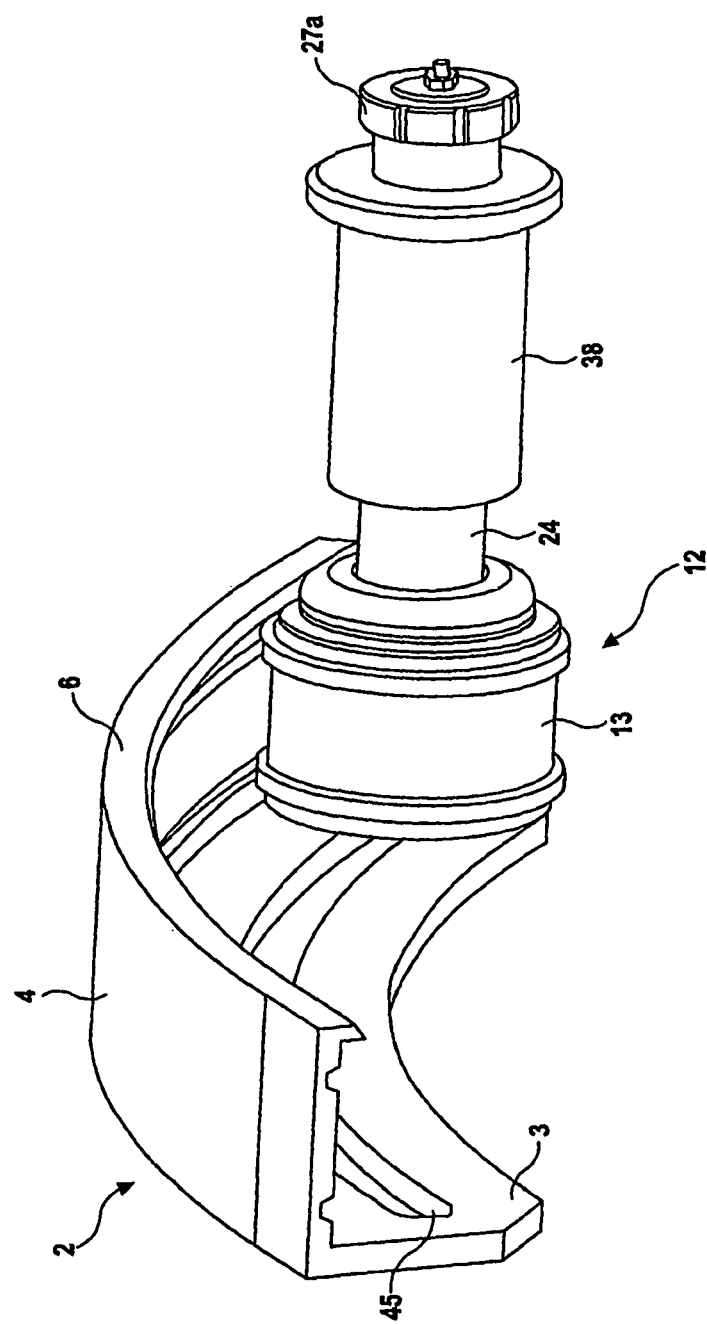
FIG. 5 is a first perspective view of an alternative embodiment with a modified, L-shaped guide track.
Figure 6:
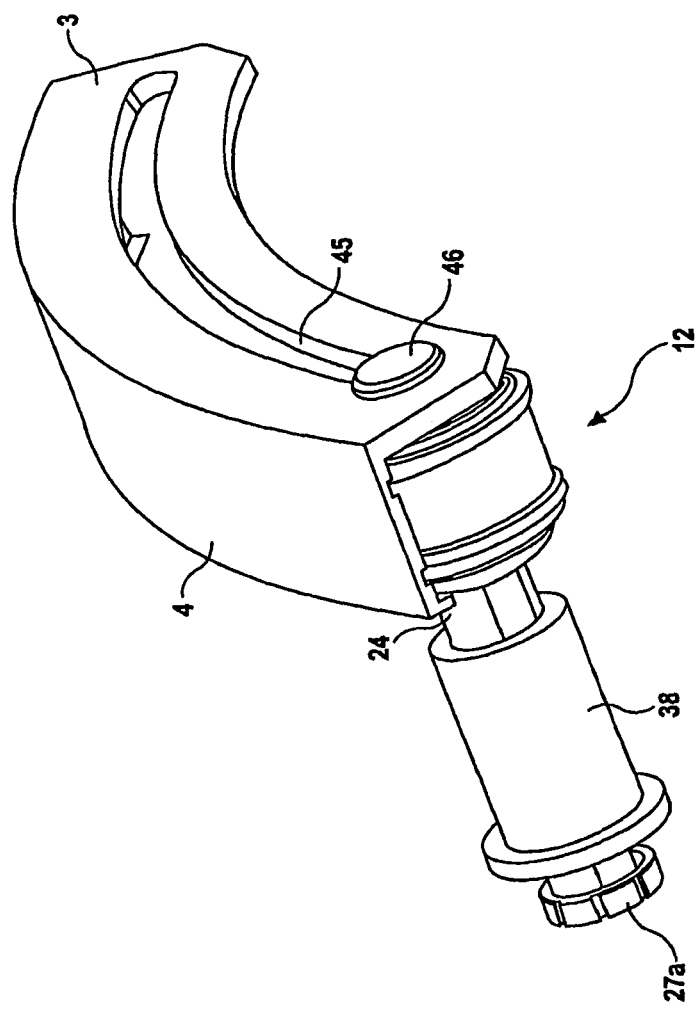
FIG. 6 is a second perspective view of the alternative embodiment shown in FIG. 5.

In an alternative embodiment, the guide track 2 may be "L" shaped, as illustrated in FIGS. 5 and 6. In this embodiment, the lower side wall 5 has been omitted because it generally only serves to constrain the bearing housing 13 within the guide track 2 and all the loads applied to the guide track 2 by the bearing follower 12 pass through the upper side wall 4. To ensure that the bearing housing 13 cannot fall away from the track 2, an arcuate slot 45 is formed in the rear wall 3 and a captivation element 46 extends through the slot 45 and is connected to the end of the shaft 23. The captivation element 46 is slideable within the slot 45 and retains the bearing follower 12 against the guide track 2 formed in the upper side wall 4.

In a preferred embodiment, the guide track 2 is mounted to the internal structure 40 (see FIG. 9) of the wing 41 such as the false work rib, and the linear bearing element 38 carried by the shaft 24 is mounted to the end flap or to an extension arm 48 which is itself an extension of the flap end 42*a*. However, it is also envisaged that the guide track 2 could be mounted to the flap 42, in which case the free end of the shaft 24 will be mounted to a structural component 40 of the wing.

It will be appreciated from the foregoing description that the spherical bearing assembly of the support assembly of the invention, together with the two-dimensional track, enables a flap 42 to be guided as it follows a three dimensional path during deployment. Together with the linear bearing assembly 38, all the required degrees of freedom that are invoked whilst deploying flaps 42 on an aircraft, such as arc of travel, wing bending misalignments and unusual flap deployment methods that are required to achieve streamwise motion are facilitated.

The present invention is primarily intended for use in supporting the end of an outboard flap on the wing of a large sub-sonic passenger aircraft, although it is envisaged that it could also be used in other flap deployment systems or wing furniture movables including swing wing applications or even leading edge high lift devices or slats and "D" nose inboard or outboard end supports.

It will be appreciated that the foregoing description is given by way of example only and that modifications may be made to the support assembly of the present invention without departing from the scope of the appended claims.

The invention claimed is:

1. A support assembly for guiding a flap on an aircraft wing during deployment of the flap, the assembly comprising a guide track defining a two-dimensional path, a cylindrical bearing follower having a longitudinal axis constrained so as to follow said path during flap deployment, a shaft extending from the bearing follower and, a spherical bearing coupling an end of the shaft to the bearing follower such that the bearing follower is rotatable relative to the shaft about the longitudinal axis of the bearing follower as it travels along the track, the spherical bearing also enabling angular rotation of the shaft about a centre point of the spherical bearing, such that a flap supported by said assembly is free to move in multiple directions.

2. A support assembly according to claim 1, wherein the bearing follower comprises a cylindrical bearing housing.

3. A support assembly according to claim 2, wherein the bearing housing and the guide track include primary guide elements that cooperate with each other to locate the bearing housing within the guide track.

4. A support assembly according to claim 3, wherein the guide elements comprise a pair of spaced parallel rails and a pair of correspondingly spaced parallel grooves, respectively.

5. A support assembly according to claim 2, wherein the guide track comprises a rear wall, a single side wall extending from said rear wall, and a retaining element to retain the bearing housing against said side wall so that it follows the path defined by said side wall.

6. A support assembly according to claim 5, wherein the guide track has a lip that depends from each side wall towards the facing side wall, each lip acting as secondary guide elements to guide movement of the bearing follower within the guide track in the event of failure of the primary guide elements.

7. A support assembly according to claim 6, wherein the bearing follower includes a cylindrical failsafe roller element immovably received within the bearing housing.

8. A support assembly according to claim 6, wherein a distance between each lip of the facing side walls of the guide track is less than a diameter of the failsafe roller element received within the bearing housing.

9. A support assembly according to claim 2, wherein the bearing follower comprises a bearing shell located within the bearing housing and defining a part-spherical concave-shaped female bearing surface.

10. A support assembly according to claim 9, wherein the bearing housing has a radially inwardly extending rim depending from a leading edge to define an opening in an end of the bearing housing opposite to the end closed by the failsafe roller element.

11. A support assembly according to claim 1, wherein the shaft has a part-spherical convex-shaped male bearing surface within the bearing housing.

12. A support assembly according to claim 11, wherein the bearing follower comprises a bearing shell located within the bearing housing and defines a part-spherical concave-shaped female bearing surface, said part-spherical convex-shaped male bearing surface being disposed so as to face the part-spherical convex-shaped female bearing surface provided by the bearing shell.

13. A support assembly according to claim 12, wherein a roller bearing element is disposed in said space between the bearing surfaces.

14. A support assembly according to claim 13, wherein the roller bearing element comprises a plurality of spherical roller bearings rotatably received within a bearing cage, said spherical roller bearings being of a diameter substantially equal to the distance between the facing bearing surfaces such that they contact both bearing surfaces and roll on both surfaces when the bearing follower rotates relative to the shaft about the longitudinal axis of the bearing follower as it travels along the track, when the shaft rotates about its longitudinal axis relative to the bearing follower and, when the shaft rotates about the centre of the spherical bearing.

15. A support assembly according to claim 1, comprising a linear bearing element mounted on the shaft to allow for relative movement between the end of the flap and the bearing follower in an axial direction extending along the shaft.

16. A support assembly according to claim 15, wherein the linear bearing element is configured for attachment to a flap on an aircraft wing and the guide track is configured for attachment to a structural component of an aircraft wing.

17. An aircraft wing having a flap supported by the support assembly according to claim 16, wherein the guide track is mounted to a structural component of an aircraft wing and the linear bearing element on the shaft is mounted to the flap.

18. An aircraft wing having a flap supported by the support assembly according to claim 15, wherein the guide track is mounted to the flap and the linear bearing element on the shaft is mounted to the wing.

\* \* \* \* \*